United States Patent [19]

Martin

[11] 4,116,299
[45] Sep. 26, 1978

[54] T-BAR BASE PLATE FOR A SEISMIC SIGNAL TRANSDUCER

[75] Inventor: Dallas James Martin, Friendswood, Tex.

[73] Assignee: Western Geophysical Co. of America, Houston, Tex.

[21] Appl. No.: 784,108

[22] Filed: Apr. 4, 1977

[51] Int. Cl.² ............................ G01V 1/14; B23K 5/66
[52] U.S. Cl. ..................................... 181/113; 29/463; 248/19; 181/114; 181/119; 181/121; 340/17 R; 181/401
[58] Field of Search ............... 181/114, 113, 119, 121, 181/401; 340/17 R; 248/19; 29/463

[56] References Cited

U.S. PATENT DOCUMENTS

| 1,622,664 | 3/1927 | Murray et al. | 29/463 |
| 3,306,391 | 2/1967 | Bays | 181/114 |

Primary Examiner—Howard A. Birmiel
Attorney, Agent, or Firm—William A. Knox

[57] ABSTRACT

An improved base plate for a vibratory seismic signal generator consists of a plurality of parallel T-bars welded together. The flange of every adjacent T-bar is inverted with respect to its neighbors.

3 Claims, 3 Drawing Figures

U.S. Patent  Sept. 26, 1978  4,116,299
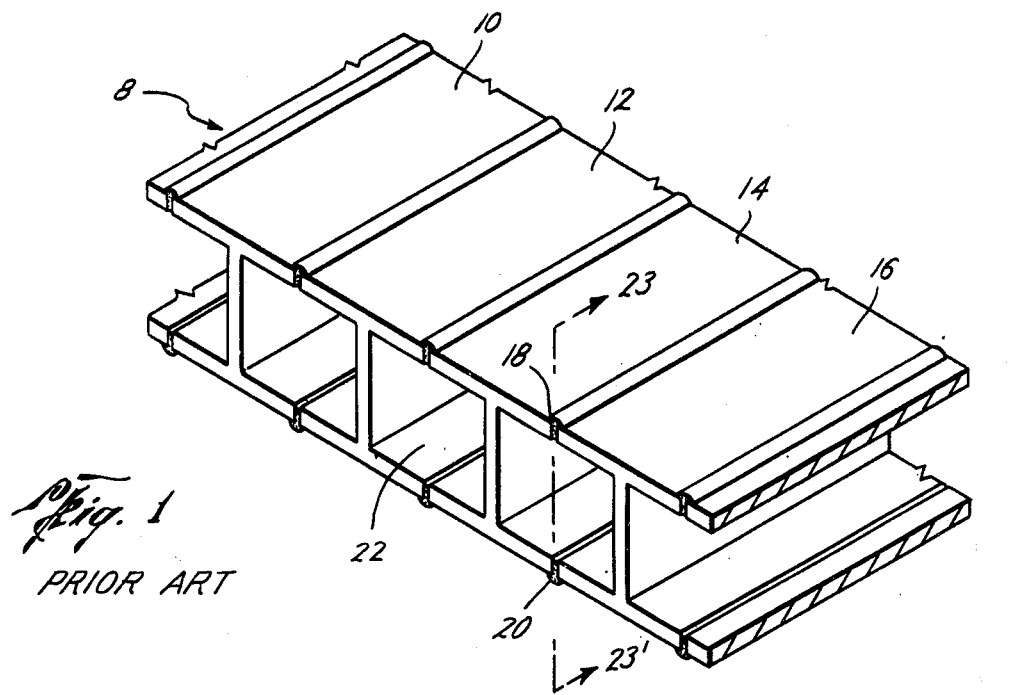
Fig. 1 PRIOR ART
Fig. 2
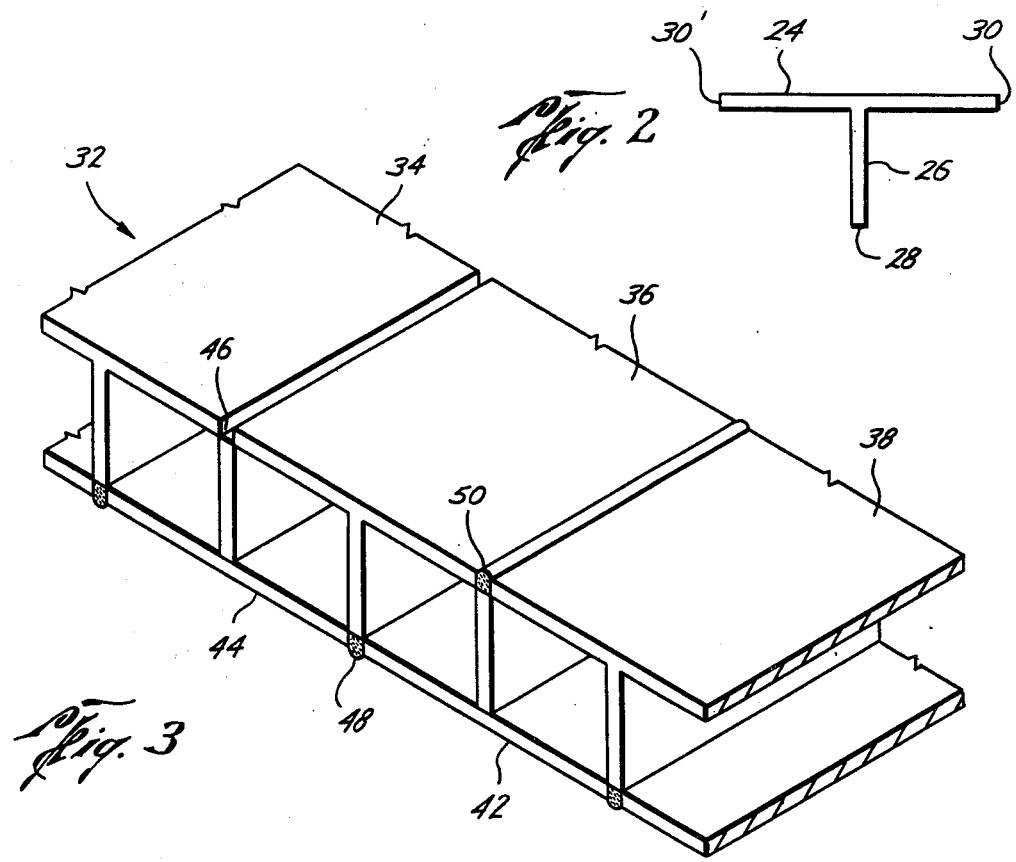
Fig. 3

T-BAR BASE PLATE FOR A SEISMIC SIGNAL TRANSDUCER

BACKGROUND OF THE INVENTION

1. Field of the Invention

This invention relates to portable vibratory seismic signal transducers.

2. The Prior Art

In a widespread method of seismic exploration a continuous wave seismic signal is injected into the earth at designated locations. The continuous waves, which preferably are comprised of a swept frequency wave train, are generated by massive vibrators or transducers mounted on a vehicle such as a truck, tractor, or buggy. A transducer consists essentially of a heavy base plate for contacting the earth's surface, a reaction or inertia mass weighing up to several tons, and a hydraulically-driven linear actuator. The linear actuator shakes the reaction mass relative to the base plate at a desired frequency, usually from 5 to 80 Hertz. The equal and opposite reaction force vibrates the base plate at a corresponding frequency, shaking the earth to generate the desired seismic signal.

Traditionally the base plate has been constructed from rows of I-beams or channels that are welded together at the flanges to form a massive rectangular plate about three feet wide and seven feet long. In such a method of construction, the welds are directly opposite each other at the top and bottom, between adjacent I-beams. Not only does this construction method permit undesired, symmetrical planes of weakness, the welds themselves tend to be imperfect because it is impossible to gain access to the underside of the weld after the I-beams have been positioned side-by-side.

A typical base plate is described in col. 4, lines 11-15 of U.S. Pat. No. 3,306,391 the base plate is shown as part number 34 in FIGS. 1, 2, and particularly FIG. 3 of the 3,306,391 patent which is incorporated by reference into this application as an illustrative example of one embodiment of a seismic signal transducer apparatus. All of the base plates described to or known by applicants have employed the above described base plate. Because of the parallel planes of weakness, prior-art base plates fail prematurely in service.

SUMMARY OF THE INVENTION

It is an object of this invention to provide a sturdy, long-lived base plate for use with a vibratory-type seismic signal transducer.

The new base plate of cellular construction is made from a series of elongated T-bars welded together in rows. Each T-bar has a flange and a stem. The flange of every adjacent T-bar is inverted relative to the flange of its neighbors. A square weld is applied to the channel formed by the edge of the stem of one T-bar and the edges of the flanges of the two adjacent T-bars.

BRIEF DESCRIPTION OF THE DRAWINGS

FIG. 1 is a showing of the method of construction of prior-art base plates;

FIG. 2 illustrates the nomenclature used in the application;

FIG. 3 is a showing of the base plate manufactured by the process of this invention.

DETAILED DESCRIPTION OF THE PREFERRED EMBODIMENT

Referring now to FIG. 1, a prior-art base plate 8 is shown. A number of I-beams 10, 12, 14, 16 are laid side-by-side as shown. The flanges of adjacent I-beams are welded together by vee-welds as at 18 and 20. Because it is not possible to gain access to the interior box-like opening 22 formed by adjacent beams, the inner part of a typical weld such as 18 or 20 is imperfect. Accordingly, parallel planes of weakness 23, 23' (dotted lines) are formed at the top and bottom surfaces of base plate 8. Additionally, two welds per beam are required.

FIG. 2 illustrates the nomenclature to be used herein in describing the T-bar base plate. The T-bar consists of a flange 24, stem 26, stem edge 28 and flange edges 30, 30'.

Referring to FIG. 3, the T-bar base plate is of cellular construction and is comprised of elongated T-bars 33-44, laid parallel, side-by-side. Typically the bars are about six to seven feet long and sufficient bars are assembled to provide a completed base plate about three feet wide. The flange of each T-bar is about seven inches wide with a three-and-three-quarter inch stem. The T-bar stock weighs about eight pounds per foot.

As shown in FIG. 3, the T-bars are arranged such that the stem edge 28 of a T-bar such as 44 just contacts the inside portion of the flange edges 30, 30' of adjacent T-bars such as 34 and 36 thereby to form a three-sided channel 46. Square welds 48 and 50 then fill the channels. Because the weld is applied evenly to the stem and flanges of any three adjacent T-bars, a strong bond is formed. The advantages of this construction are that the lines of weakness, if any, are staggered between the top and bottom of base plate 32. Furthermore, only one-half the number of welds are required as in the prior art.

I claim as my invention:

1. In a transducer system for use in seismic exploration for imparting a continuous wave signal into the ground by applying a vibratory force between a floating inertia mass and a base plate for contacting the ground, an improved process for manufacturing said base plate comprising the steps of:

assembling a plurality of T-bars of predetermined length in rectangular side-by-side relationship, each said bar having a flange, a stem, flange edges and a stem edge, the flange of each said T-bar being inverted with respect to every adjacent T-bar, the stem edge of one T-bar being in contact with the inside portion of the flange edges of the adjacent bars, thereby forming a channel; and applying a square weld to said channel formed by said three edges.

2. In a seismic signal transducer for shaking the ground, a ground contacting base plate of cellular construction, the cells being formed by a plurality of elongated, parallel T-bars each having a flange, the flanges of every T-bar being inverted with respect to the adjacent T-bars, the flanges and stems of adjacent T-bars being joined by a weld.

3. The base plate defined by claim 2 wherein said weld is a square weld.

* * * * *